United States Patent [19]

Burgdorf et al.

[11] Patent Number: 5,029,952
[45] Date of Patent: Jul. 9, 1991

[54] SLIP-CONTROLLED BRAKE SYSTEM WITH A MASTER BRAKE CYLINDER

[75] Inventors: Jochen Burgdorf, Offenbach-Rumpenheim; Hans-Dieter Reinartz, Frankfurt am Main; Helmut Steffes, Hattersheim, all of Fed. Rep. of Germany

[73] Assignee: Alfred Teves GmbH, Frankfurt am Main, Fed. Rep. of Germany

[21] Appl. No.: 458,691

[22] PCT Filed: Apr. 27, 1989

[86] PCT No.: PCT/EP89/00466

§ 371 Date: Jan. 19, 1990

§ 102(e) Date: Jan. 19, 1990

[87] PCT Pub. No.: WO89/11988

PCT Pub. Date: Dec. 14, 1989

[30] Foreign Application Priority Data

Jun. 1, 1988 [DE] Fed. Rep. of Germany ...... 3818707

[51] Int. Cl.$^5$ .................. B60T 8/32; B60T 8/44; B60T 13/12
[52] U.S. Cl. .................. 303/116; 303/119; 303/114
[58] Field of Search .............. 303/114, 113, 116, 119, 303/100, 50-56; 188/358, 359; 60/547.1, 555

[56] References Cited

U.S. PATENT DOCUMENTS

| | | | |
|---|---|---|---|
| 4,212,501 | 7/1980 | Miyakawa et al. | 303/116 |
| 4,417,768 | 11/1983 | Satoh et al. | 303/113 |
| 4,453,782 | 6/1984 | Arikawa et al. | 303/119 X |
| 4,618,189 | 10/1986 | Nakanishi et al. | 303/119 X |
| 4,703,979 | 11/1987 | Nakanishi et al. | 303/119 X |
| 4,728,155 | 3/1988 | Resch | 303/119 X |
| 4,750,788 | 6/1988 | Seibert et al. | 303/116 X |
| 4,775,196 | 10/1988 | Braschel et al. | 303/119 X |
| 4,781,421 | 11/1988 | Nishimura et al. | 303/119 X |
| 4,787,685 | 11/1988 | Klein | 303/114 |
| 4,793,663 | 12/1988 | Ocvirk et al. | 303/119 X |
| 4,798,422 | 1/1989 | Becker | 303/113 X |
| 4,828,333 | 5/1989 | Reinartz et al. | 303/116 X |

FOREIGN PATENT DOCUMENTS

| | | |
|---|---|---|
| 2450874 | 5/1975 | Fed. Rep. of Germany . |
| 3622556 | 1/1988 | Fed. Rep. of Germany . |
| 3629564 | 3/1988 | Fed. Rep. of Germany . |
| 3726302 | 2/1989 | Fed. Rep. of Germany . |

*Primary Examiner*—Douglas C. Butler
*Attorney, Agent, or Firm*—Robert P. Seitter; J. Gordon Lewis

[57] ABSTRACT

To control the pressure at the outlet of a pump and to position the pedal during a brake slip control action, an additional arrangement is provided to an existing master brake cylinder which arrangement comprises a transmission piston (5) as well as a shut-off valve (30). The closure member of the shut-off valve is loaded by way of a valve piston (28) and by the pressure in the brake line (18') in opposition to the pressure at the outlet of the pump. The valve closure member is thus pressure-balanced so that no forces are transmitted onto the tappet (37). Therefore, the ramp (40) at the transition piston (5) need not be separately hardened during the manufacturing process.

5 Claims, 1 Drawing Sheet

SLIP-CONTROLLED BRAKE SYSTEM WITH A MASTER BRAKE CYLINDER

The present invention relates to a slip-controlled brake system comprising a master cylinder whose working chamber communicates with a supply reservoir wherein a pair of pistons cooperate with a shut-off valve to control pressure at an outlet pump.

A like brake system, which is described in German Patent application No. P3726302, bears the advantage that the master brake cylinder is not uncoupled from the wheel brakes during a brake slip control action. Therefore the volume in the master brake cylinder is available as an additional volume, in the event that the rate of delivery of the pump is momentarily insufficient during a brake slip control action. Pedal positioning is effected simultaneously by way of actuation of the shut-off valve by the master brake cylinder piston. The shut-off valve is actuated by means of a ramp on the working piston of the master brake cylinder. The ramp is arranged in such a way that the shut-off valve is in a closed position when the working piston is slid far into the master brake cylinder. The pressure-fluid connection which is controlled by the shut-off valve is open when the working piston assumes a position which is only a small difference from the initial position.

By this arrangement, during a brake slip control action, that is with the pump switched on, the working piston and thus the pedal are set into a position which corresponds to the transition between the two mentioned areas.

The shut-off valve is designed such that the closure member can be pushed open by a ramp-controlled tappet in opposition to the pump pressure. Thus, the full pump pressure acts upon the tappet which takes support on the peripheral surface of the working piston. In doing so, the pressure causes a friction force between the tappet and the peripheral surface of the working piston which hinders the latter in its axial movement. This must be avoided especially during a slip control action, since the additional volume which is to be removed from the master brake cylinder must be supplied very quickly to the wheel brake. A retarded pressure fluid supply would have negative effects on the control quality.

The pressure of the tappet on the peripheral surface as well as the rapid movements of the piston during a brake slip control action cause damages in the area of the control ramp. Hence, it follows that the fatigue durability of the material soon is exhausted. At best, this shortcoming can be counteracted by performing complicated and costly hardening processes.

Therefore, it is an object of the present invention to modify the known brake system in such a fashion that its advantages are preserved (accumulator effect of the master brake cylinder, pedal positioning), on the one hand, and that its fatigue durability is augmented without having to perform intricate hardening measures, on the other hand.

Another disadvantage of the known brake system is that the shut-off valve must be mounted on a conventional master brake cylinder construction so that a new design or construction of the master brake cylinder is necessary. Therefore, another object to be achieved by the present invention is to embody the desired functions in an additional arrangement which can be connected to the existing master brake cylinders.

SUMMARY OF THE INVENTION

This object is achieved in that the working piston of the master brake cylinder is composed of a piston and an additional transmission piston, a hydraulic pressure cushion being formed between these pistons, and in that the closure member of the added shut-off valve is acted upon by the pressure in the pressure cushion in the closing sense and by the pressure at the outlet of the pump in the opening operation. It is therefore accomplished that the closure member of the shut-off valve is substantially pressure-balanced so that no forces are transmitted onto the working piston. Since the pump is switched on only during a brake slip control action, the pressure of the pressure cushion loads the tappet during a conventional braking operation, that is during braking without brake slip control. However, this is not crucial, since the piston moves to and fro only once during a conventional braking operation. In the phase of many small strokes of the piston during a brake slip control action, which phase is critical for the durability of the material, no pressure force is transmitted onto the tappet.

The shut-off valve can be actuated both by the piston and by the transmission piston. Yet in order to devise the additional arrangement, the shut-off valve is actuated by the transmission piston. The transmission piston and shut-off valve form an assembly unit which can be connected to existing master brake cylinder systems, for example, by way of a connecting line. To influence the pressures at the shut-off valve so that no force is applied on the tappet, the transmission piston is provided as a stepped piston so that a level of pressure prevails in the pressure cushion other than that in the outlet of the pump.

The working chamber in front of the transmission piston must be connected to a supply reservoir in the initial position of the transmission piston. This can be realized by way of a breathering bore. Another favorable embodiment provides that the transmission piston contains a longitudinal bore comprising a closable non-return valve. A tappet is guided in this bore which is coupled to a diaphragm, the diaphragm being adjacent to the pressure cushion on the one side and to a supply reservoir on the other side thereof.

BRIEF DESCRIPTION OF THE DRAWINGS

The advantages and features of the present invention will become better understood by reference to the following detailed description when taken in conjunction with the accompanying drawing wherein.

DETAILED DESCRIPTION

Figure 1:
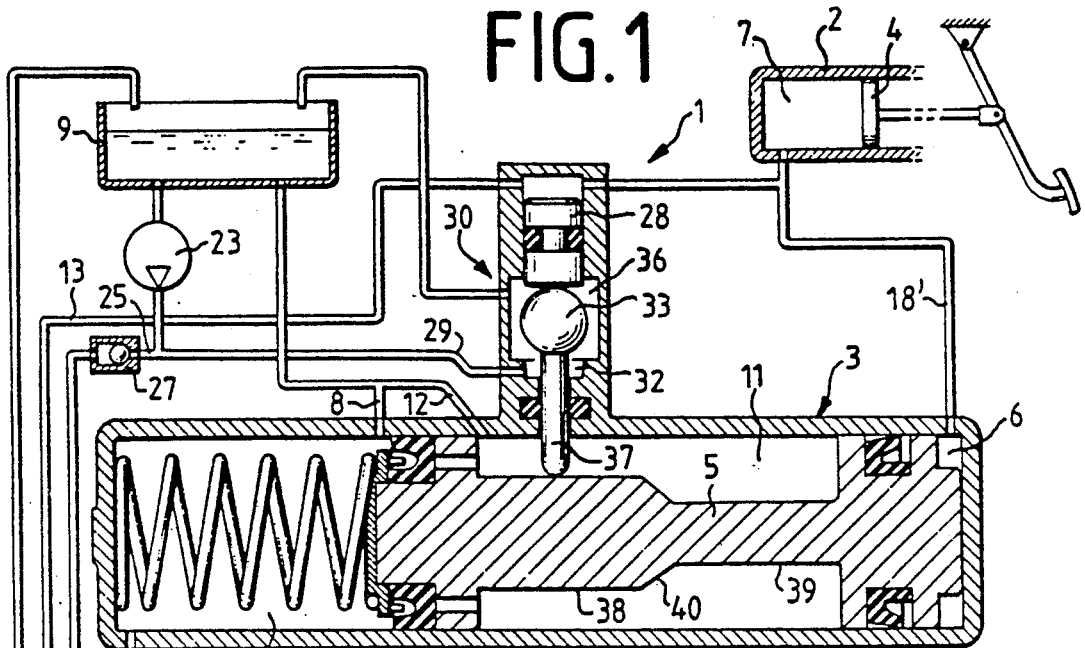
FIG. 1 illustrates a brake system in accordance with a first embodiment of the present invention; and, FIG. 2 illustrates a second embodiment of the brake system in accordance with the present invention.

The embodiments shown are largely identical. One difference is in the device for establishing a pressure-fluid connection between the working chamber 10 and the supply reservoir 9 in the initial position of the transmission piston 5. Another difference resides in the design of the transmission piston 5. In the embodiment according to FIG. 1, the piston is a piston of constant diameter, while it is a stepped piston in the embodiment according to FIG. 2. As the embodiments are identical in all other respects, like elements bear like reference numerals.

The brake system in the embodiment according to FIG. 1 comprises a master brake cylinder 1 which is composed of a braking pressure generator 2 and a pressure-transmitting unit 3. The braking pressure generator 2 comprises a cylinder with a pedal-operated piston 4 confining a pressure chamber 7 in the cylinder. The pressure-transmitting unit 3 comprise a transmission piston 5 which is sealingly guided in a counterpressure chamber 6 and with its other end surface a working chamber 10. Pressure chamber 7 and counterpressure chamber 6 are in communication by way of a brake line portion 18'. Another brake line portion 18" connects the working chamber 10 with a wheel brake 31. An inlet valve 19 is arranged in this brake line portion which is electromagnetically actuated and which is open in its de-energized state. A relief line 21 connects the wheel brake 31 with the supply reservoir 9. An outlet valve 20 is arranged in this line which is actuated likewise electromagnetically and which is closed in its de-energized state. A shunt line 13 provides direct communication between the wheel brake 31 and the pressure chamber 7. Inserted into this line is a non-return valve 14 opening towards the pressure chamber 7. A pressure-fluid connection is provided between the working chamber 10 and the supply reservoir 9 in the illustrated initial position of the transmission piston 5. In FIG. 1, this connection is shown by a breathering bore 8 which is closed by displacement of the transmission piston 5.

Figure 2:
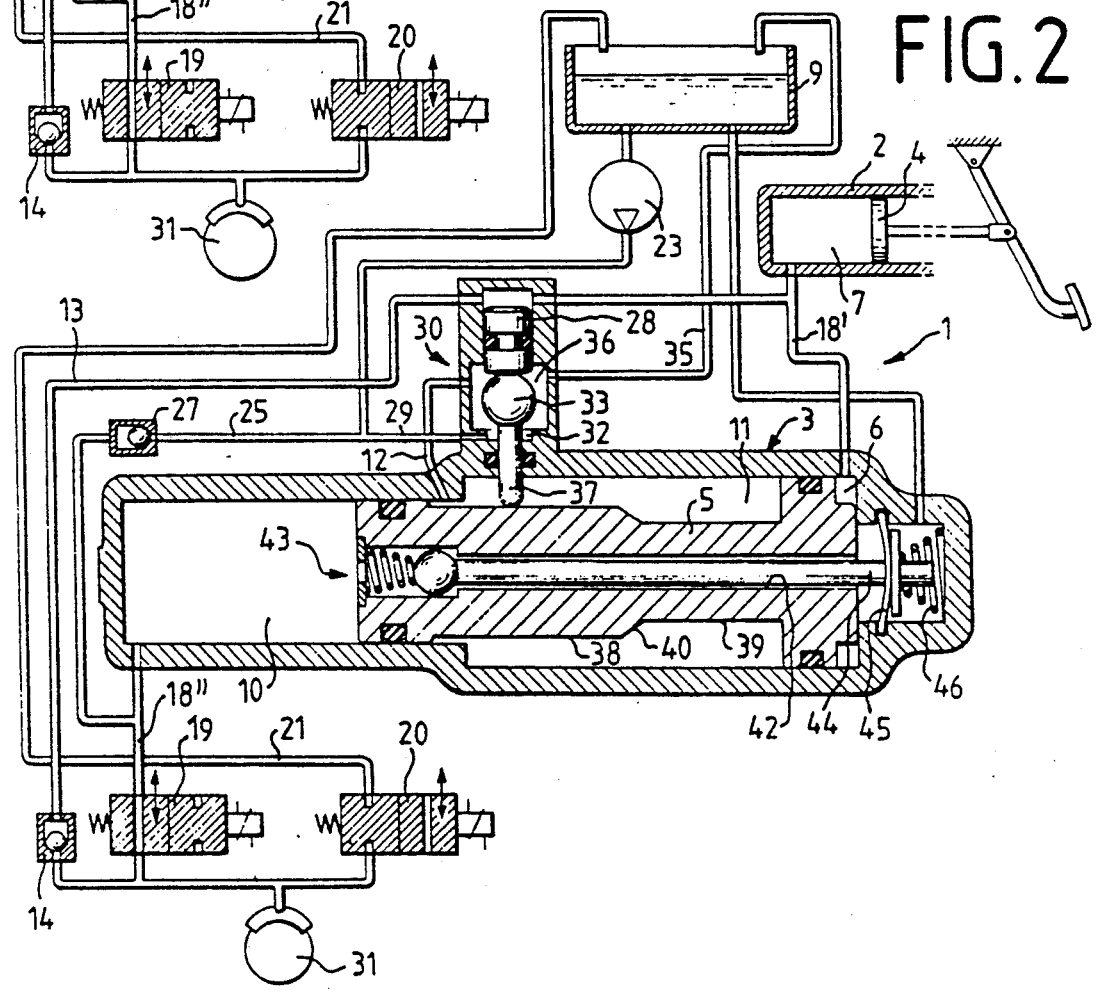

In the embodiment according to FIG. 2, a longitudinal bore 42 is provided in the transmission piston 5 interconnecting the counterpressure chamber 6 and the working chamber 10. This duct contains a closable non-return valve 43 shutting off towards the counterpressure chamber 6. Further, duct 42 accommodates a tappet 44 abutting on the closure member of the non-return valve 43. Furthermore, the tappet 44 is coupled to a diaphragm 45 which is adjacent to the counterpressure chamber 6 and which confines a chamber on its other side which is connected to the supply reservoir 9. A spring 46 which acts upon the diaphragm and thus on the tappet 44 keeps the tappet 44 in abutment on the closure member of the non-return valve 43 so that the duct 42 is open. As soon as pressure is generated in the counterpressure chamber 6, this pressure displaces the diaphragm 45 in opposition to the force of the spring 46 so that the valve member of the non-return valve 43 moves to sit on its associated valve seat. The non-return valve 43 thus performs its function.

The transmission piston 5 has a waist in its mid-portion, with an annular chamber 11 being formed thereby. This annular chamber 11 is in communication with the supply reservoir 9 by way of a channel 12. Arranged vertically in relation to the axis of movement of the transmission piston 5 is a tappet 37 which abuts on the peripheral surface of the transmission piston 5. On the other side of the tappet, a valve ball 33 abuts which is pressed by a valve piston 28 against the tappet. The end surface of the valve piston 28 which is averted from the valve ball 33 bounds a chamber which is in communication with the brake line 18'. The tappet extends through an inlet chamber 32 which terminates into a valve seat 34. The valve ball 33 itself is arranged in the outlet chamber 36.

A pump 23 supplies fluid by way of a conduit 29 into the inlet chamber 32. The outlet chamber 36 is in communication with the supply reservoir 9 by way of a conduit 35. Further, the outlet of the pump 23 is in communication with the brake line 18" by way of a pressure line 25. Inserted into the pressure line 25 is a non-return valve 27 closing towards the pump. A ramp 40 is formed on the peripheral surface of the transmission piston 5 which separates two areas 38, 39 from each other. When tappet 37 is disposed in the area 38, it lifts the valve ball 33 from its sealing seat 34 so that the pump 23 can pump fluid into an open cycle 29, 32, 36, 35 to the supply reservoir 9. When tappet 37 is in the area 39, the ball bears against the valve seat and closes the mentioned cycle.

A hydraulic pressure cushion is formed between the pistons (4, 5), wherein a closure member (33) of the shut-off valve (30) is acted upon by the pressure in the pressure cushion in the closing operation and by the pressure at the outlet of the pump (23) in the opening operation.

The brake system described operates as follows: To initiate a braking operation, the pedal is applied, with the result that the piston 4 is shifted into the pressure chamber 7, and the pressure fluid out of the pressure chamber 7 is supplied into the counterpressure chamber 6. This causes movement of the transmission piston 5 which supplies the pressure fluid out of the working chamber 10 to the wheel brakes. The wheel brakes are pressurized, with the result being that the wheel decelerates and the vehicle slows down. The rotational behavior of the wheel is constantly monitored so that an imminent locked condition can be detected at once. When this case occurs, the pump 23 is switched on, and the valves 19, 20 switch over. Pressure fluid flows through the open outlet valve 20 out of the wheel brake 31 into the supply reservoir 9 so that pressure relief takes place.

It should be pointed out that two cases are to be distinguished. When, at the beginning of the brake slip control action, the transmission piston 5 is in a position which with little difference from its basic position, then tappet 37 is still in the area 38. This means that the cycle is open and the pump supplies unpressurized fluid into the open cycle. When now the valve 19 is opened (after valve 20 has been closed) for renewed pressure build-up in the wheel brake, pressure fluid is removed from the working chamber 10, whereby the transmission piston 5 moves to the left in the illustrations of the figures. The pedal follows this movement. This movement continues until the transmission piston 5 has reached a position where the tappet has reached the area of the ramp 40. As a result, the shut-off valve 30 will close so that the pump delivers fluid by way of the pressure line 25 into the working chamber 10. This causes resetting of the transmission piston 5, whereby the shut-off valve opens. In this manner, a control action is performed which ensures that pressure proportional to pedal force prevails in the working chamber 10.

The other possibility is that, upon commencement of slip control, the transmission piston 5 moved so far that tappet 37 is in the area 39. The pump is switched on with the beginning of the slip control action and delivers fluid into the working chamber 10, whereby the piston is moved to the right until the tappet reaches ramp 40 and the valve opens. The control action previously described will commence. Valve 19 is opened for pressure build-up in the wheel brake. The fluid requirement of the wheel brake can be of such a large amount that the instantaneous rate of delivery of the pump does not suffice and that pressure fluid must be taken from the working chamber 10. The transmission piston 5 then moves to the left, which causes the valve 30 to instantaneously close and the pump to supply the full quantity of pressure fluid to the wheel brakes and the working chamber 10. In this manner, the transmission piston 5 will constantly move to and fro during a brake slip control action, which would result in destruction of the sliding surface of the tappet on the peripheral surface of the piston, in the case where the tappet were loaded by considerable pressure. However, this is avoided in that the system composed of valve piston 28 and valve ball 33 is pressure-balanced. Hence it follows that no force is transmitted onto the tappet 37 which otherwise would have to be supported on the peripheral surface. The shunt line 13 with the non-return valve 14 provides intervening in a control action by decreasing the pedal force. The reducing pressure in the pressure chamber 7 propagates directly into the wheel brake 31.

In order to provide that a connection is provided between the wheel brakes and the supply reservoir in the initial position of the transmission piston 5, a breathering bore 8 can be arranged. In this case, however, there is a small lost travel, since the breathering bore must first be overridden before pressure can develop in the working chamber 10. This lost travel is prevented by the provision of a non-return valve 43 which, preferably, is arranged in the piston 5 itself. This non-return valve 43 is kept in its opened position by a tappet 44, the tappet 44 being arranged on a diaphragm 45, as has been explained. As soon as pressure is built up in the pressure chamber 10 and in the counterpressure chamber 6, the diaphragm will move in such a fashion that the tappet is moved away from the closure member of the non-return valve and shuts off the connection. The additional fluid input caused by displacement of the small diaphragm is insignificant.

What is claimed is:

1. A slip-controlled brake system comprising a master brake cylinder (1) whose working chamber (10) communicates with a supply reservoir (9) in the brake release position, said master brake cylinder (1) comprising a braking pressure generator (2) having a pressure chamber (7) therein and being coupled to a brake pedal and said master brake cylinder (1) further comprising a pressure-transmitting unit (3) having counterpressure chamber (6) therein said system comprising a hydraulic pump (23) whose suction side is connected with the supply reservoir (9) and whose pressure side is connected with the working chamber (10) by way of a first pressure fluid conduit (25), and comprising wheel brakes which communicate with one of the working chamber (10) or with the supply reservoir by way of pressure-modulation valves (19, 20) controlled by a slip control apparatus, comprising a second pressure fluid conduit (29, 35) in which a shut-off valve (30) including a closure member (33) is inserted and which connects the pressure side of the pump (23) with the supply reservoir (9), said shut-off valve (30) being mounted adjacent said pressure-transmitting unit (3) said shut-off valve being alternately open and closed as a function of an operating piston located in said shut-off valve (30) wherein the working piston of the master brake cylinder is composed of a piston (4) located in the chamber (7) of said braking pressure generator (2) and a transmission piston (5) locating in the counterpressure chamber (6) of said pressure-transmitting unit (3), said chamber being separated wherein a hydraulic pressure cushion is formed between the master cylinder pistons (4, 5), and wherein said closure member (33) of the shut-off valve (30) is acted upon by the pressure in the pressure cushion in the closing operation and by the pressure at the outlet of the pump (23) in the opening operation, and a tappet (37) extending between and coupled to sad closure member (33) and said transmission piston (5).

2. A brake system as claimed in claim 1, wherein the shut-off valve (30) is actuated by the transmission piston (5).

3. A brake system as claimed in claim 1, wherein the transmission piston (5) is a stepped piston, the larger end surface thereof being acted upon by the pressure in the pressure cushion.

4. A brake system as claimed in claim 1, wherein the transmission piston (5) contains a longitudinal bore (42) into which a non-return valve (43) is inserted which opens towards the working chamber (10).

5. A slip-controlled brake system comprising a master brake cylinder (1) whose working chamber (10) communicates with a supply reservoir (9) in the brake release position, said system comprising a hydraulic pump (23) whose suction side is connected with the supply reservoir (9) and whose pressure side is connected with the working chamber (10) by way of a first pressure fluid conduit (25), and comprising wheel brakes which communicate with one of the working chamber (10) or with the supply reservoir by way of pressure modulation valves (19, 20) controlled by a slip control apparatus, comprising a second pressure fluid conduit (29, 35) in which a shut-off valve (30) including a closure member (33) is inserted and which connects the pressure side of the pump (23) with the supply reservoir (9), said shut-off valve being alternately open and closed as a function of an operating piston located in said shut-off valve (30) wherein the working piston of the master brake cylinder is composed of a piston (4) and a transmission piston (5), said master cylinder pistons being separated by a chamber wherein a hydraulic pressure cushion is formed between the pistons (4, 5), said shut-off valve (30) being mounted adjacent to said master cylinder (1) and wherein a closure member (33) of the shut-off valve (30) is acted upon by the pressure in the pressure cushion in the closing operation and by the pressure at the outlet of the pump (23) in the opening operation, wherein the transmission piston (5) contains a longitudinal bore (42) into which a non-return valve (43) is inserted which opens towards the working chamber (10) and, wherein the closure member of the non-return valve (43) cooperates with a tappet (44) guided in the bore, the tappet being attached to a diaphragm (45) which is adjacent to a counterpressure chamber (6) on one side thereof and to the supply reservoir (9) on the other side thereof.

* * * * *